(12) United States Patent
de Morais

(10) Patent No.: US 6,347,595 B1
(45) Date of Patent: Feb. 19, 2002

(54) DISTRIBUTOR OF HORTICULTURAL SEEDS FOR A SOWING AGRICULTURAL IMPLEMENT

(75) Inventor: Fabricio Rosa de Morais, Ribeirão Preto (BR)

(73) Assignee: Justino de Morais, Batatais (BR)

( * ) Notice: Subject to any disclaimer, the term of this patent is extended or adjusted under 35 U.S.C. 154(b) by 0 days.

(21) Appl. No.: 09/720,579
(22) PCT Filed: Apr. 20, 2000
(86) PCT No.: PCT/BR00/00035
 § 371 Date: Jan. 17, 2001
 § 102(e) Date: Jan. 17, 2001
(87) PCT Pub. No.: WO00/64234
 PCT Pub. Date: Nov. 2, 2000

(30) Foreign Application Priority Data

Apr. 23, 1999 (BR) .......................................... PI 9903060

(51) Int. Cl.[7] ................................................. A01C 7/04
(52) U.S. Cl. .......................... 111/174; 111/177; 111/185; 221/211; 221/266; 221/278
(58) Field of Search ................................. 111/177, 185, 111/77, 78, 174; 221/211, 266, 278

(56) References Cited

U.S. PATENT DOCUMENTS 5,535,917 A 7/1996 Ribouleau ................... 221/211

FOREIGN PATENT DOCUMENTS

BE 480800 A 2/1948
EP 0636305 A 2/1995

*Primary Examiner*—Christopher J. Novosad
(74) *Attorney, Agent, or Firm*—Darby & Darby

(57) ABSTRACT

A distributor of horticultural seeds for a sowing agricultural implement, comprising a casing (10) and a disc (20) rotatably mounted inside the casing (10), dividing the latter into a seed chamber (CS) and in a suction chamber (CA) maintained in fluid communication with a suction device and selectively and adjustably connectable with the atmosphere, said disc (20) having at least two rows of holes (21, 22), each comprising a selector (50, 60) having a leading edge extension (51, 61), which is selectively displaced, in order to interfere, upon rotation of the disc (20), with the path of a predetermined part of the seeds which are pneumatically carried in each hole of the respective row of holes (21, 22), so that each hole enters the discharge chamber (CD) carrying a desired number of seeds, the discharge chamber (CD) being opened to discharge channels (15, 16) arranged in such a way as to receive the seeds released from a respective row of holes (21, 22), when they enter the discharge chamber (CD) and to direct them to a descending duct, inferiorly opened to a respective soil furrower, which is longitudinally disaligned in relation to the other furrowers.

6 Claims, 5 Drawing Sheets

DISTRIBUTOR OF HORTICULTURAL SEEDS FOR A SOWING AGRICULTURAL IMPLEMENT

FIELD OF THE INVENTION

The present invention refers to a pneumatic seed distributor, which is vacuum operated (by suction—negative pressure) and to be mounted to a sowing agricultural implement, particularly a sowing agricultural device used for planting seeds with low mass and reduced dimensions, such as some horticultural seeds, either bare or coated.

BACKGROUND OF THE INVENTION

There are known in the art the pneumatic distributors comprising a casing with a substantially cylindrical shape, in whose inside is rotatably mounted, to a horizontal shaft, usually coaxial to the cylinder axis, a flat disc, usually provided with a concentric row of circumferentially spaced holes, whose cross section is smaller than that of the seeds to be planted. The rotating disc divides the casing, medianly, in a seed chamber, which receives the seeds coming from a feeding reservoir mounted to the agricultural implement, and in a suction chamber, which is maintained in fluid communication with a vacuum source dimensioned to draw the air from the inside of the suction chamber, causing a depression inside the latter in relation to the seed chamber, and making the seeds of the seed chamber, which are submitted to a certain angular displacement by actuation of an agitating means incorporated to the disc, be retained against the holes until they reach, with the angular rotation of the disc, a discharge chamber, from which the seeds, no more subjected to the pressure differential between the seed chamber and the suction chamber, are released from the holes and fall by gravity towards the soil.

In these pneumatic distributors, each hole of the disc commonly receives and retains, upon passing by the lower portion of the seed chamber, more than one seed, avoiding the distribution of the seeds onto the soil to occur in a uniform way, which is necessary to efficiently use the seeds, as a function of the sown area. The inadequate distribution of the seeds may easily reach a level which makes the productivity of the sown plants economically unacceptable, or which results in a final product not complying with the physical patterns required by the market.

Aiming at minimizing the operational problem cited above, the known pneumatic distributors are provided, inside the casing, with a seed selecting device, which acts on the row of holes, to promote the withdrawal of the excess seeds from the holes and therefore permit an adequate and uniform distribution of the seeds onto the soil.

To allow the same disc to operate adequately with different average patterns of seeds of a determined type, the selecting device is selectively adjustable from the outside of the casing, so as to act more or less intensively on the row of holes, guaranteeing the maintenance of only one seed in each hole. The adjustment of the interfering positioning of the selective device with the row of holes will depend on the physical characteristics of the seeds being planted.

It is also known in the art the provision, in the suction chamber, of an air intake, provided with an adjustment means, in order to obtain the adjustment of the pressure differential between the chambers and, consequently, of the pneumatic force that retains the seeds in the holes of the disc, as a function of the dimensions and of the density of the seeds being planted.

The adjustment of the position of the selector and of the intensity of the sub-pressure in the suction chamber allows the adjustment of the distributing device for each seed pattern, assuring the desired sowing uniformity, with each hole usually releasing only one seed.

Brazilian Patent PI 9404952, corresponding to the French Patent 2713436 and to U.S. Pat. No. 5,535,917, describes and claims a pneumatic distributor of the type considered herein, but having a disc with multiple concentric rows of holes and a selecting device, acting solely on one of the end rows of holes, so that the excess seeds, which are extracted from said row of holes, provoke the withdrawal of the excess seeds from the other rows of holes which are not subjected to the direct action of the selecting device.

According to the specification of this prior patent, the multiple concentric rows of holes with the adequate an predetermined actuation of a selector on one of the rows allows a higher density in the distribution of seeds to be simultaneously obtained, by using only one selector and obtaining the liberation of only one seed corresponding to each hole, by means of a relatively low rotational speed of the disc.

As mentioned in this prior art document, the solution described and claimed therein is designed to the sowing of seeds under a high density regimen, such as those from soy-bean, sorghum, sunflower, cotton, beans, etc., and with a high sowing speed. In this example, as well as in other cereal cultures, the seeds have a critical mass, which makes impossible, at least in theory, to obtain the "indirect selecting" effect disclosed in PI 9404952-1. According to this effect, the excess seeds, extracted from a row of holes by the selector, hit the excess seeds of the adjacent row, removing them from the holes.

This type of seed selection proposed by the prior art has, among others, the serious inconvenience of being totally infeasible to promote the discharge of the excess seeds when horticultural seeds are concerned, since these seeds invariably have small dimensions, different densities and are very light, not having enough mass to provoke said indirect selecting effect. The use of this known solution in the horticultural field would result in a disordered planting.

Besides the inconvenience cited above, it should be further observed that the prior art has a discharge device, which collects the seeds from soy-bean, sorghum, sunflower, cotton, beans and from other agricultural products, pneumatically liberated from the holes, and conducting them to the soil through a single duct. With this known arrangement, the planting is obtained in only one alignment, with the seeds being mutually spaced as a function of the rotational speed imparted to the disc and of the number of holes. But, in the case of some horticultural products, such as carrot, onion, beetroot, radish and the like, the product to be commercialized should be within average dimensional patterns highly desired by the market. These products of a desired size sell better, being therefore, more competitive. Since these products are sown in a single alignment, they tend to assume dimensions not complying with the desired patterns, and they usually reach larger sizes, as their plants develop with no laterally adjacent competing plants, which function as mutual controllers of the growth of the products, avoiding, with a relative positioning between the seeds, that very large or very small bulbs are picked up.

Still another aspect of the known pneumatic distributors relates to keeping the holes in the operational condition during the sowing operation. In this devices, it is not rare to happen that a seed of smaller dimensions or any kind of debris be stuck inside a hole, even when the latter is passing by the seed discharge region, from which the seeds, in an angular displacement, leave the suction chamber. The prior art devices do not have a pneumatic cleaning device to ensure the cleaning of the holes just after the seeds are discharged.

DISCLOSURE OF THE INVENTION

It is an objective of the present invention to provide a pneumatic distributor of horticultural seeds, which is vacuum operated and to be mounted to a sowing agricultural implement and which permits to obtain a uniform sowing of different patterns of seeds with small dimensions and reduced mass, on multiple rows, with the seeds of one row being offset in relation to the seeds of the adjacent row.

It is a further objective of this invention to provide a distributor of the type mentioned above and which has a self-cleaning pneumatic device for its seed selecting means.

The objectives above are attained by the provision of a distributor of horticultural seeds for a sowing agricultural implement, conventionally comprising a casing and a disc rotatably mounted inside the casing, dividing the latter into a seed chamber and in a suction chamber maintained in fluid communication with a suction device and selectively and adjustably connected to the atmosphere, said disc having, in a concentric circular arrangement, at least two rows of mutually spaced holes, said casing having a discharge chamber, inside which is provided a certain circumferential extension of the rows of holes subjected only to the atmospheric pressure of the seed chamber.

According to the invention, the distributor comprises, for each row of holes, a selector mounted inside the casing, adjacent to the face of the disc turned to the seed chamber and having a leading edge extension, which is selectively displaceable, in order to interfere, upon rotation of the disc, with the path of a predetermined part of the seeds which are pneumatically carried in each hole of the respective row of holes, so that each hole enters the discharge chamber carrying a desired number of seeds, the discharge chamber being inferiorly opened to discharge channels defined between the casing and the face of the disc turned to the seed chamber, each discharge channel being arranged in such a way as to receive the seeds released from a respective row of holes, when they enter the discharge chamber and to direct them to a descending duct, inferiorly opened to a respective soil furrower, which is longitudinally disaligned in relation to the other furrowers.

The construction defined above allows, not only the known adjustment of the intensity of the pneumatic force that retains the seeds in the holes of the disc, making it adequate to the mass of the seeds being planted, but also a precise adjustment of the level of interference that each selector in the respective row of holes, ensuring the uniform supply of a certain number of seeds, preferably one seed in the case of bare seeds, for each hole reaching the discharge chamber upon rotation of the disc and providing the sowing of multiple rows of seeds, each row corresponding to a soil furrower of the sowing device, thus forming a double line of seeds on the soil, spaced from each other. Thus, it is achieved a sowing arrangement with characteristics not provided by the solutions known heretofore and which may be further developed with the holes of the adjacent rows of holes being angularly offset.

BRIEF DESCRIPTION OF THE DRAWINGS

The invention will be described below, with reference to the appended drawings, in which.

BEST MODE OF CARRYING OUT THE INVENTION

Figure 1:
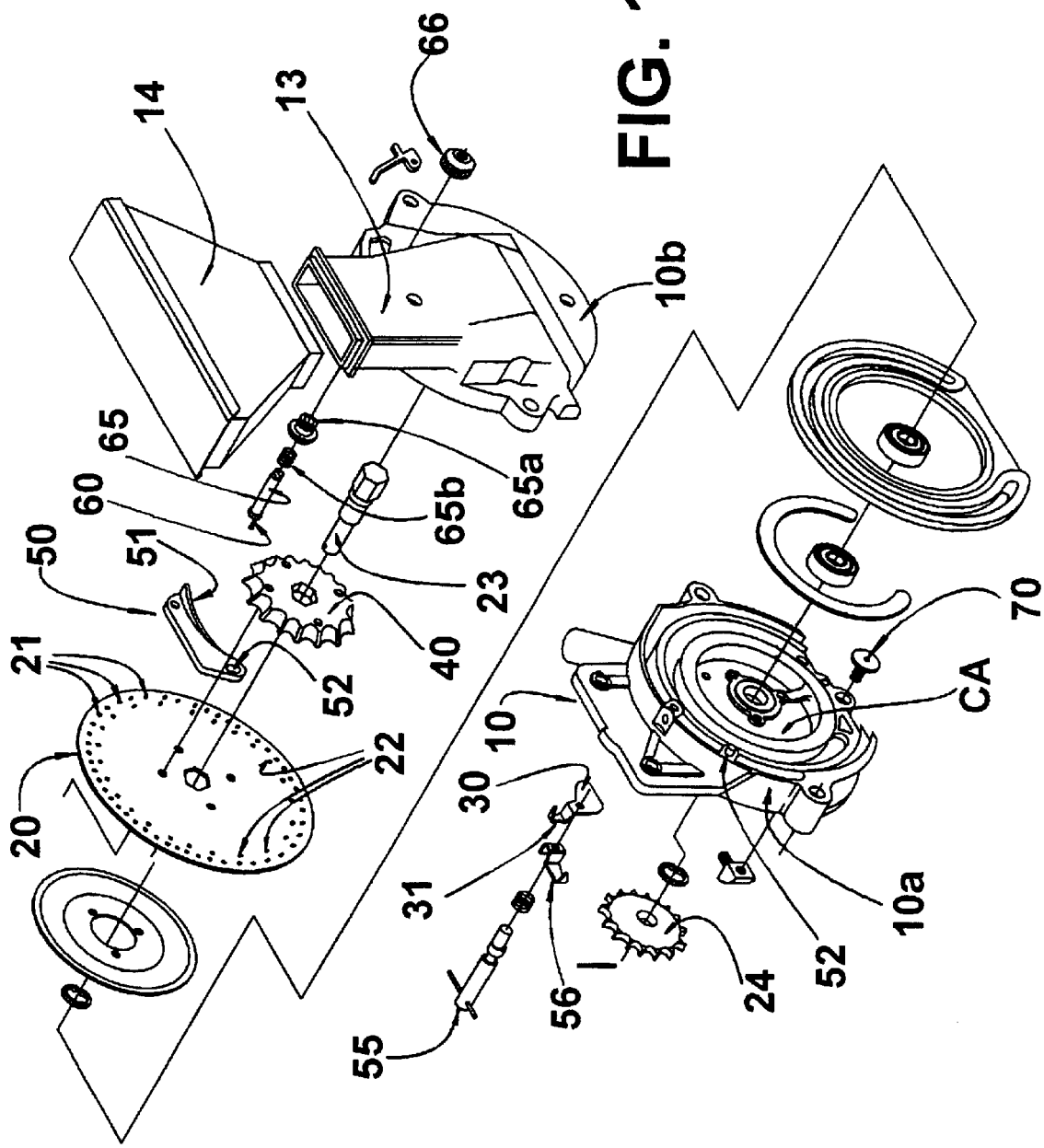
FIG. 1 is an exploded simplified perspective view of the seed distributor of the present invention.
Figure 2:
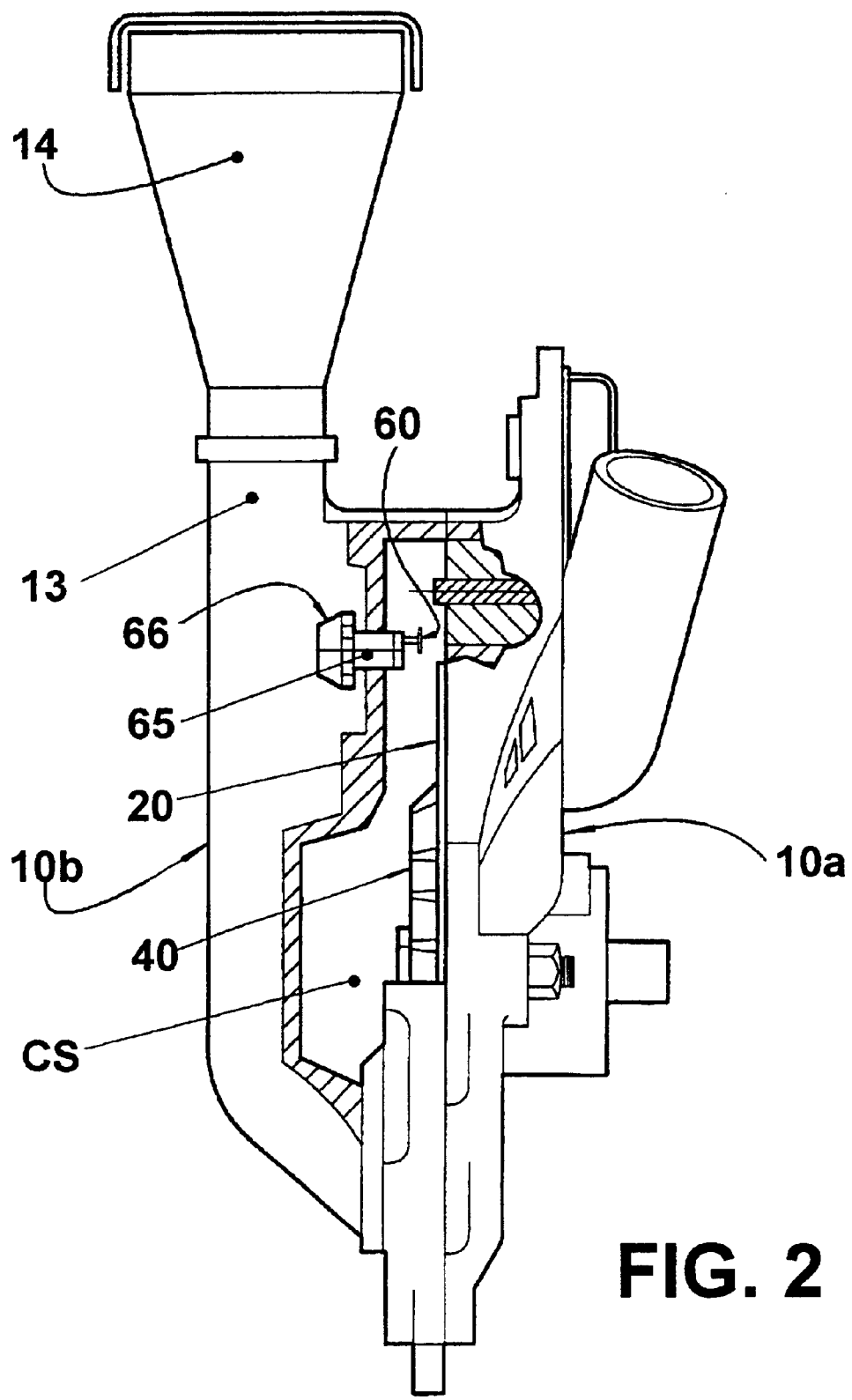
FIG. 2 is a partially cut lateral view of the casing of the distributor.
Figure 3:
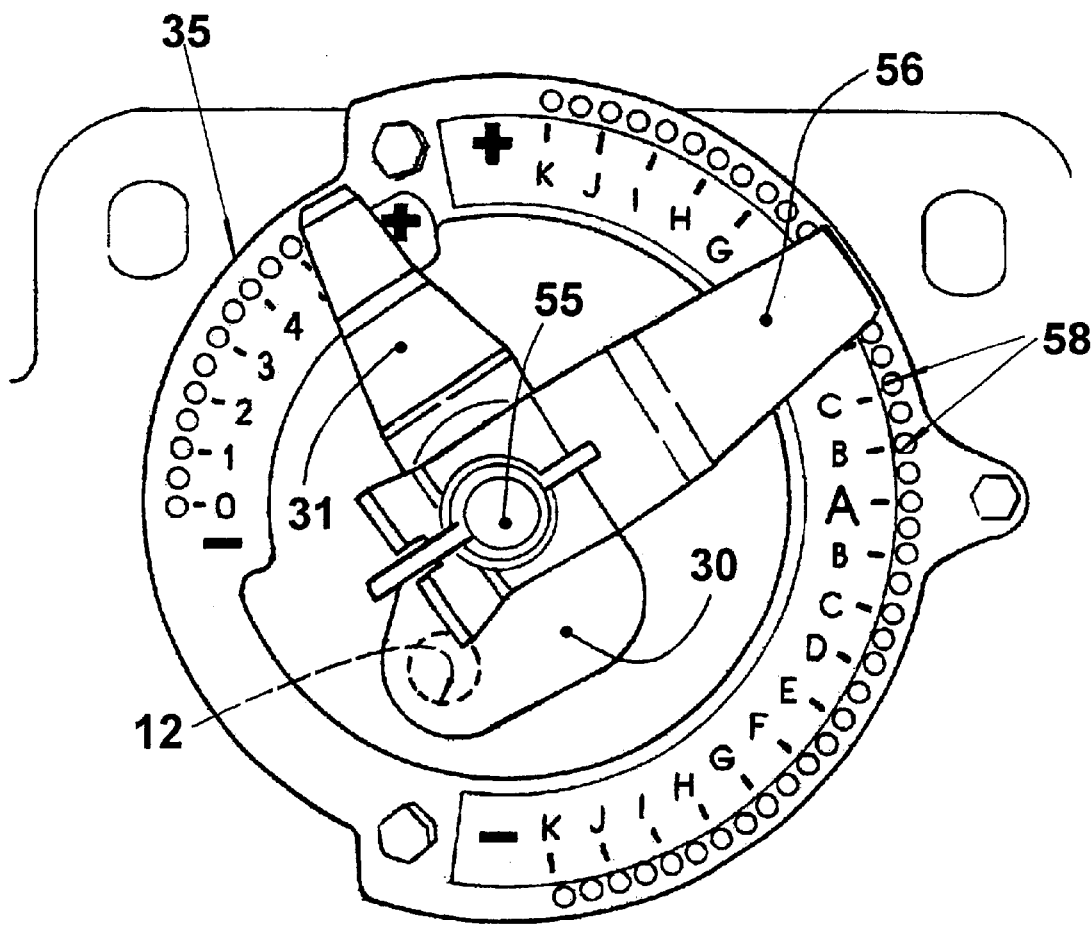
FIG. 3 illustrates an enlarged detail of part of an external frontal view of the casing portion connected to the suction device.
Figure 4:
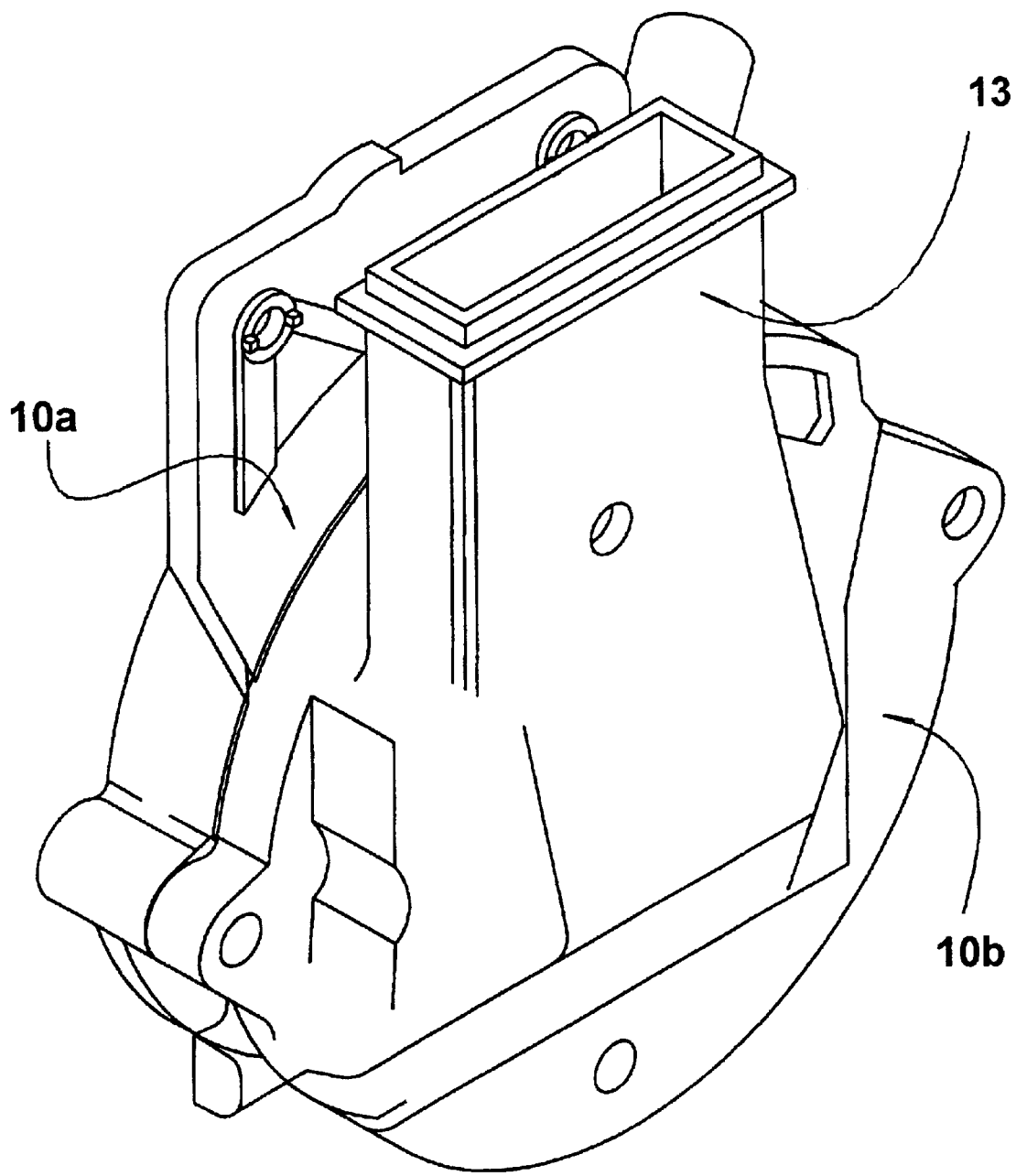
FIG. 4 illustrates an external front view of the casing portion that defines the seed chamber and the discharge channels.
Figure 5:
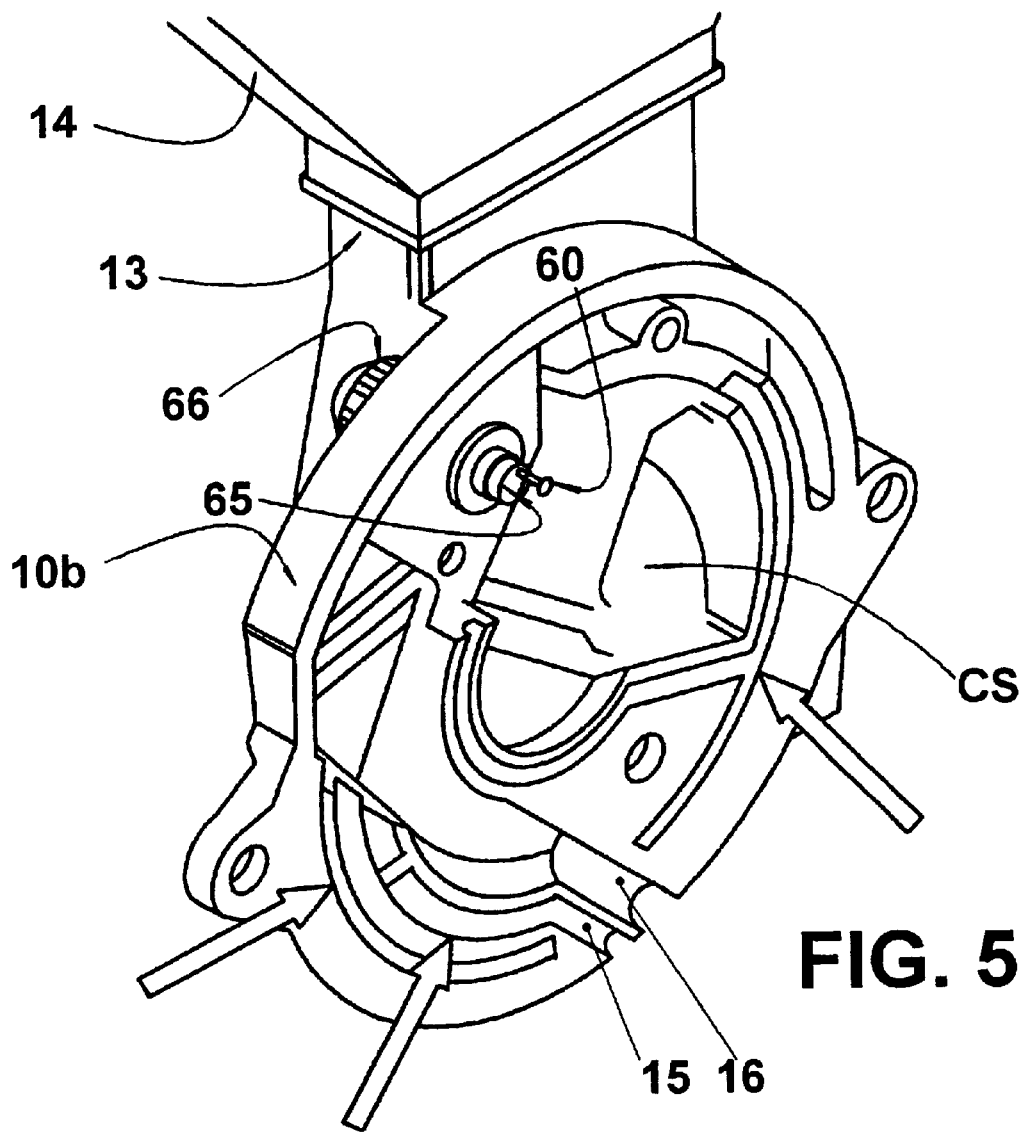
FIG. 5 illustrates an internal front view of the casing portion illustrated in the previous figure.
Figure 5A:
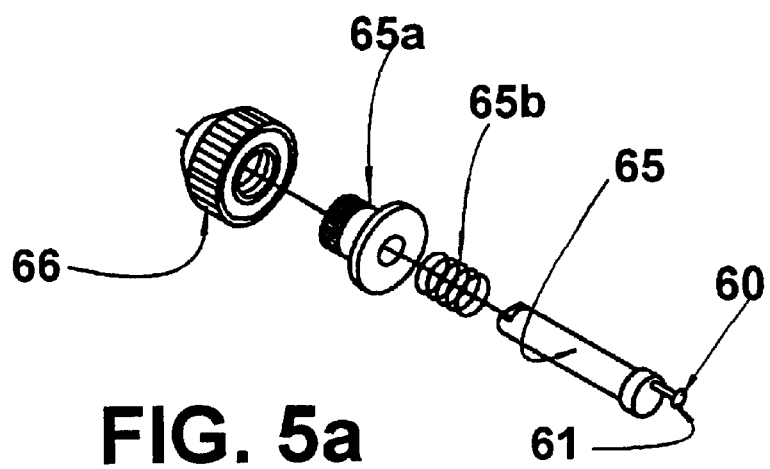
FIG. 5a is a detail in an enlarged exploded perspective view of part of FIG. 1, illustrating the selector acting on the innermost row of holes.

As mentioned before and illustrated in the appended drawings, the present seed distributor is of the type comprising a casing 10, which is substantially cylindrical, with its axis horizontally disposed, and which is formed by a body portion 10a and by a cover portion 10b affixed to said body portion 10a by means of peripheral flanges mutually screwed in a known arrangement. Between the body portion 10a and the cover portion 10b of the casing 10 is rotatably mounted a disc 20 having, in a concentric circular arrangement, at least two rows of holes 21, 22 circumferentially spaced from each other. The holes 21 and 22 are dimensioned to have a cross section inferior to the minimum cross section of the pattern of the seeds to be planted, being preferably provided two rows of holes 21 and 22, with the holes of a row being angularly offset in relation to those of the adjacent row.

The disc 20 is mounted to a shaft 23, which is rotatably driven by any adequate means synchronized with the speed in which the implement is moving, such as by mechanical transmission through a toothed wheel 24 affixed to the shaft 23 of the disc 20 and operatively coupled to the shaft of at least one of the supporting wheels of the sowing agricultural implement.

In a known prior art arrangement, the disc 20 divides the casing 10 in a suction chamber CA and in a seed chamber CS, the suction chamber CA being formed inside the body portion 10a of the casing 10 and having an aperture 11, usually superior, conducting to any suction device (not shown), such as a fan, and an air intake 12, in communication with the atmosphere and whose degree of opening may be adjusted by an independent lever, from a closed position, guaranteeing a maximum sub-pressure in the suction chamber CA, up to a fully open position, conducting to a minimum sub-pressure in the suction chamber CA. The adjustment of the air intake 12 is obtained by rotation of an obturator 30, which is externally pivoted on the body portion 10a of the casing 10 and incorporates a lever in the form of an indicative rod 31, whose angular positioning on a scale 35 incorporated outside the casing 10 indicates the degree of opening imparted to the air intake 12.

The seed chamber CS is formed inside the cover portion 10b of the casing 10 and has a seed admission opening 13, coupled to the bottom of a feeding hopper 14. Inside the seed chamber CS operates an agitator 40 which, in the construction illustrated, takes the form of a toothed wheel affixed to the shaft 33 of the disc 20, close to the face of the latter turned to the seed chamber CS. The function of the agitator 40 is well known in the art and does not require further description. However, the construction proposed in the form of a toothed wheel simplifies the construction of the disc-agitator assembly, allowing an easy interchangeability between the parts, which is not possible in the constructions in which the agitator is incorporated to the disc in a single piece.

The seeds revolved by the agitator 40 inside the seed chamber CS are drawn by the holes 21 and 22 of the disc 20 while the latter rotates around its axial shaft, but, in each hole 21, 22 multiple seeds are usually pneumatically retained and conducted by the disc 20 towards a discharge chamber CD formed in the casing 10 and in which the disc 20 now has its holes 21, 22, in a certain extension of the rows, subjected solely to the pressure existing inside the seed chamber CS, in order to allow the pneumatic liberation of the seeds conducted up to this point.

In order that each hole 21, 22 of the disc 29 reaches the discharge chamber CD, conducting a desired minimum amount of seeds, there is provided a selector to act on each row of holes in a region of the seed chamber CS upstream the discharge chamber CD.

Considering the illustrated construction, the outermost row of holes 21 receives a selector 50 in the form of a plate adjacent to the face of the disc 20 turned to the seed chamber CS and having a leading edge extension 51 in the shape of a concave arc, so that with the angular rotation of the plate around a point 52 for pivoting it to the body portion 10a of the casing 10, it may adjustably interfere more or less intensively with the circular path of a predetermined part of the seeds pneumatically retained in each hole 21 of the external row of holes, in order to expel from the disc all the excess seeds, leaving in each hole only a desired number of seeds, which may be one, or more than one, that will reach the discharge chamber CD.

The adjustment of the angular positioning of the selector 50 is achieved by means of an eccentric (not illustrated) acting on the selector 50 at a point distal from its point 52 for pivoting it to the casing 10, said eccentric being driven by a shaft 55 journalled through the end wall of the body portion 10a of the casing 10 and having its end external to the latter coupled to a handling radial rod 56, whose bent free end moves on a perforated scale 58 in the form of an arc of a circle externally incorporated to the body portion 10a, for indicating the degree of interference of the selector 50 with the respective outermost row of holes 21.

In the illustrated embodiment, the obturator 30 and its indicative rod 31 are incorporated to a tubular bushing journalled around the shaft 55. Although the driving axes of both the obturator 30 and the selector 50 are coaxial in this embodiment, the obturator 30 has an operation independent from that of the selector 50, avoiding that the positioning adjustment of one of the parts interferes with that of the other part. However, it should be understood that the scale 35 and the perforated scale 58 may be used together with a table to be given by the manufacturer of the distributor and which allows the user to make at least one adequate basic adjustment of the intensity of the pneumatic retention of the seeds in the disc and of the degree of interference of the selector 50 with the respective row of holes 21 for a determined pattern of seed to be planted.

On the other hand, the innermost row of holes 22 is submitted to the interference of a selector 60, which takes the form of a small circular plate placed adjacent to the face of the disc 20 turned to the seed chamber CS and having a leading edge extension 61 which is made interfere, more or less intensively, with the circular path of the seeds retained in the innermost row of holes 22. The plate that defines the selector 60 itself is eccentrically incorporated to the inner end of a shaft 65 which is journalled through the end wall of the cover portion 10b of the casing 10, through the bushing 65a and spring 65b, in order to have an end external to the latter carrying a small wheel 66 to be manually grasped and for adjusting the position of the internal selector 60, which allows the withdrawal of the excess seeds, carried to the innermost row of holes 22.

As best illustrated in FIG. 6, the discharge chamber CD is opened to discharge channels 15 and 16 defined in low relief at the cover portion 10b, between the latter and the disc 20, each discharge channel 15 and 16 being arranged so as to receive the seeds liberated from a respective row of holes 21, 22, when they enter the discharge chamber CD and to conduct them to a descending duct, which is not illustrated and has any conventional construction, and which is inferiorly opened to a respective soil furrower, which is not illustrated, either, due to the fact that its construction is not a relevant aspect to understand the present invention.

Considering that it is not rare to occur a partial or total obstruction of one of the orifices 21 and 22 by several types of debris, or even by a seed, whose dimensions are much smaller than the pattern being planted, there has been added to the present distributor a self-cleaning pneumatic device for the holes, comprising at least one air jet nozzle 70 which is supplied by a pressurized air source, which may be defined by the own discharge of the suction device which provokes sub-pressure in the suction chamber CA. The air jet nozzle 70 is affixed to the body portion 10a of the casing 10, transversally to the plane of rotation of the disc 20, in order to launch a jet of pressurized air against the holes 21 and 22, in the opposite direction to that of the pneumatic retention of the seeds in the disc 20, just after said holes leave the region of the discharge chamber CD and discharge channels 15 and 16. This air jet is usually sufficient to expel any debris from the inside of the holes 21, 22, throwing said debris onto the soil, since, in the region where the air jet nozzle 70 is provided, the disc 20 has its opposite face turned to the seed chamber CS opened to the atmosphere.

What is claimed is:

1. A distributor of horticultural seeds sowing agricultural implement, comprising:

a casing, a disc rotably mounted inside the casing, dividing the casing into a seed chamber and a suction chamber, the suction chamber being maintained in fluid communication with a suction device and selectively and adjustably connectable with the atmosphere, the disc having, in a concentric circular arrangement, at least two rows of holes comprising of at least a first row of holes and a second row of holes wherein the casing having a discharge chamber, a circumferential extension of the at least two rows of holes being disposed within the discharge chamber and subject only to the atmospheric pressure of the seed chamber, a first selector mounted inside the casing for the first row of holes and, a second selector mounted inside the casing for the second row of holes, each of the first selector and the second selector being disposed adjacent to a face of the disc turned to the seed chamber and each having a leading edge extension, which is selectively displaced, in order to interfere, upon rotation of the disc, with the path of a predetermined part of the seeds which are pneumatically carried in each of the holes of the respective row of holes, so that each hole enters the discharge chamber carrying a desired number of seeds, the discharge chamber being inferiorly opened to at least two discharge channels defined between the casing and the face of the disc turned to the seed chamber, each discharge channel being arranged so as to receive the seeds released from a respective row of holes, when they enter the discharge chamber and to direct the released seeds to a descending duct, inferiorly opened to a respective soil furrower.

2. The distributor of claim 1, wherein the first selector acts on the outermost row of holes and comprises a plate disposed adjacent to the face of the disc turned to the seed chamber and comprising a leading edge extension in the form of a concave arc, said plate of the selector being angularly and selectively displaced around a point for pivoting said plate with respect to the casing.

3. The distributor of claim 2, wherein the first selector is angularly displaced by actuation of an eccentric mounted to a shaft journalled to the casing, and the shaft having an end external to the casing coupled to a handling axial rod, whose bent free end is displaced over a perforated scale externally incorporated to the casing and indicative of the degree of interference of the first selector with the outermost row of holes.

4. The distributor of claim 3, wherein the communication of the suction chamber with the atmosphere is achieved through an air intake provided in the casing and whose degree of opening is determined by rotation of an obturator pivoted externally to the casing, coaxially to and independently from the shaft which drives the first selector, the obturator incorporating a lever in the form of an indicative rod, whose angular positioning on the scale incorporated outside the casing indicates the degree of opening imparted to the air intake.

5. The distributor of claim 1, wherein the second selector acts on the innermost row of holes and is comprised of a circular plate disposed adjacent to the face of the disc turned to the seed chamber, the second selector being eccentrically affixed to the inner end of a shaft journalled to the casing, in an opposite side in relation to the first selector, an outer end of the shaft carrying a small wheel which may be manually grasped.

6. The distributor of claim 1, further comprising at least one air jet nozzle for a self-cleaning operation, a pressurized air source being in fluid communication with at least one air jet nozzle, the at least one air jet nozzle being affixed to the casing transversely to the plane of rotation of the disc, in order to launch a jet of pressurized air against the holes in the opposite direction to that of the pneumatic retention of the seeds in the disc, just after said holes leave the region of the discharge chamber and discharge channels.

* * * * *